United States Patent
Lack et al.

[11] Patent Number: 5,984,061
[45] Date of Patent: Nov. 16, 1999

[54] VIBRATION DAMPER, ESPECIALLY FOR MOTOR VEHICLES

[75] Inventors: Sabine Lack, Schweinfurt; Günther Braun, Geldersheim, both of Germany

[73] Assignee: Mannesmann Sachs AG, Schweinfurt, Germany

[21] Appl. No.: 08/986,144

[22] Filed: Dec. 5, 1997

[30] Foreign Application Priority Data

Dec. 20, 1996 [DE] Germany ............................ 196 53 393

[51] Int. Cl.⁶ ...................................................... F16F 9/00
[52] U.S. Cl. ................................ 188/322.19; 188/321.11; 403/269
[58] Field of Search ................................ 188/322.19, 313, 188/316, 317, 318, 321.11; 267/64.11, 64.13, 141.3, 141.4, 141.5, 260, 264, 269, 270, 292, 293; 403/265, 269; 29/434, 450, 455.1, 506, 507, 508

[56] References Cited

U.S. PATENT DOCUMENTS

| | | | |
|---|---|---|---|
| 3,575,442 | 4/1971 | Elliott | 267/65 X |
| 3,830,347 | 8/1974 | Fader et al. | |
| 4,167,992 | 9/1979 | McClellan | 188/322.19 |
| 4,199,855 | 4/1980 | McClellan | 29/450 |
| 4,222,805 | 9/1980 | Karklins et al. | 156/184 |
| 4,364,457 | 12/1982 | Wossner et al. | 188/322.17 |
| 5,358,225 | 10/1994 | Volpel et al. | 267/64.12 |
| 5,730,262 | 3/1998 | Rucks et al. | 188/321.11 |
| 5,794,742 | 8/1998 | Lack et al. | 188/321.11 |

FOREIGN PATENT DOCUMENTS

| | | |
|---|---|---|
| 678 596 | 9/1966 | Belgium . |
| 82 28 262.5 | 1/1983 | Germany . |
| 37 35 058 | 4/1989 | Germany . |
| 195 08 851 | 9/1996 | Germany . |
| 681 650 | 10/1952 | United Kingdom . |
| 977 287 | 12/1964 | United Kingdom . |
| 1 083 382 | 9/1967 | United Kingdom . |

*Primary Examiner*—Robert J. Oberleitner
*Assistant Examiner*—Pamela J. Lipka
*Attorney, Agent, or Firm*—Cohen, Pontani, Lieberman & Pavane

[57] ABSTRACT

A vibration damper, especially for a motor vehicle, with at least one tubular structural component part, an axially displaceable piston rod which is guided out of the tubular structural component part, a fastening element which is fixedly secured with the piston rod and which can be fastened with a wheel suspension or a body of a motor vehicle, and a protective tube which is arranged at the piston rod and encloses the tubular structural component part. The protective tube is connected with the piston rod in a positive engagement and/or in a frictional engagement in its region facing the fastening element.

9 Claims, 3 Drawing Sheets

FIG. 1
FIG. 2
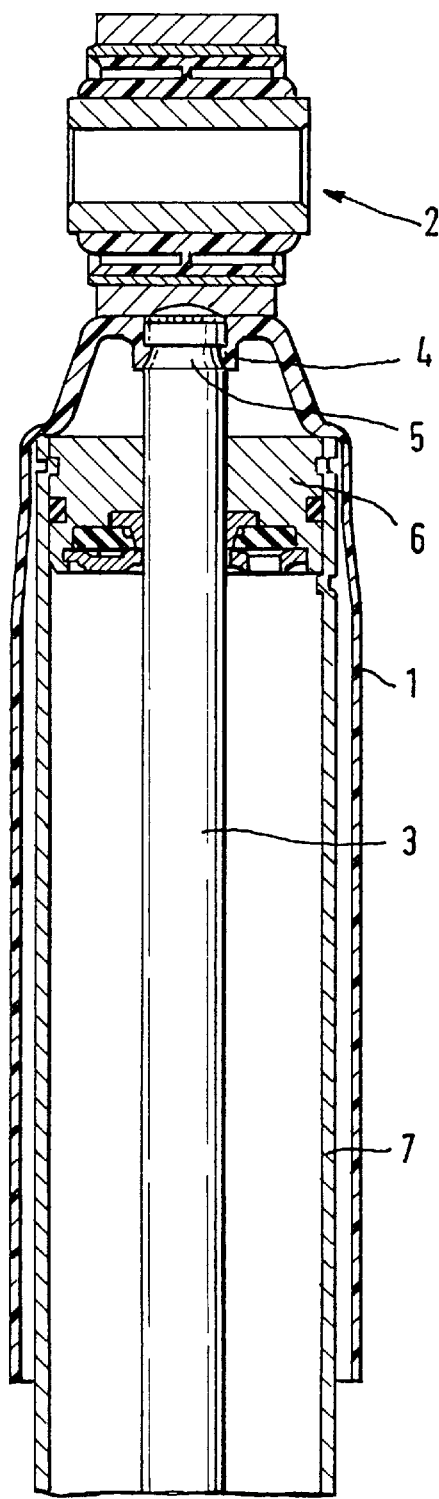
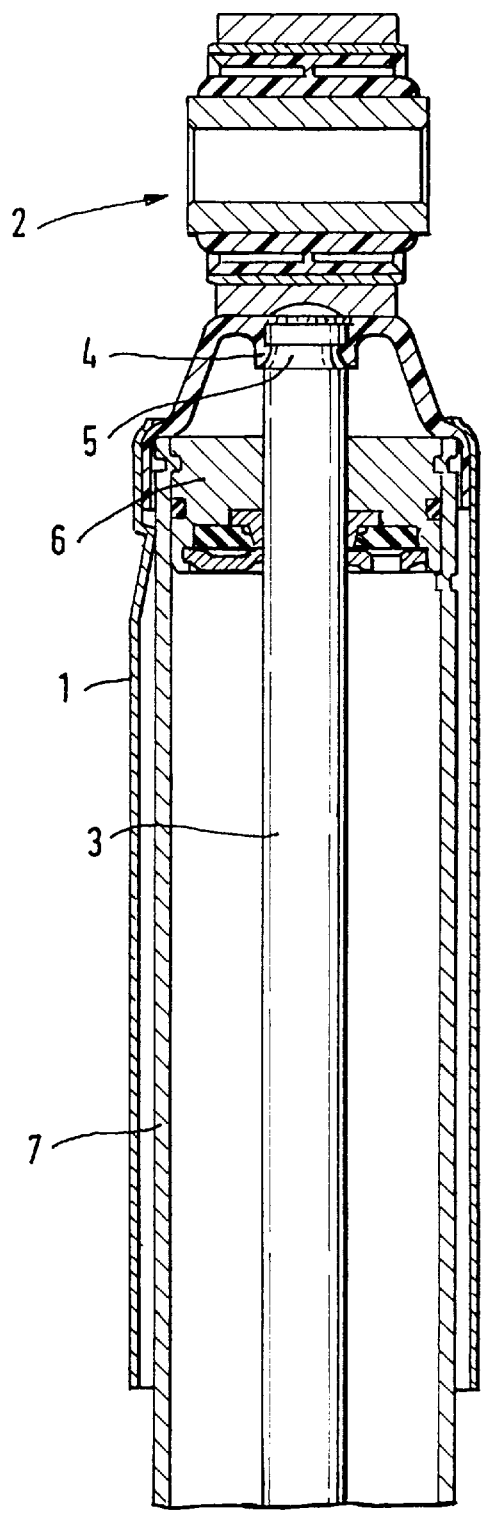

VIBRATION DAMPER, ESPECIALLY FOR MOTOR VEHICLES

BACKGROUND OF THE INVENTION

1. Field of the Invention

The invention relates to a vibration damper, especially for a motor vehicle. More particularly, the invention relates to a vibration damper having at least one tubular structural component part, an axially displaceable piston rod which is guided out of the tubular structural component part, a fastening element which is fixedly secured with the piston rod and which can be fastened with a wheel suspension or a body of the motor vehicle, and a protective tube which is arranged at the piston rod and encloses the tubular structural component part.

2. Discussion of the Prior Art

Protective caps for vibration dampers are already known (e.g., German reference DE-OS 37 35 058). The vibration damper has a piston rod which is guided out of the receptacle tube, and a protective tube is fastened at the end of the piston rod on the outlet side. The protective tube encloses the receptacle tube and is provided with retaining means for support means for supporting the shock absorber in the installed position. In addition, the protective tube is connected with the piston rod via a protective tube cap, wherein additionally, a further protective cap is arranged. The protective tube and the protective cap can only be mounted without difficulty when the piston rod is constructed with a threaded pin in a tapered form.

Further, shock absorber legs with a piston rod and a tube enclosing the vibration damper are also known (e.g., German reference DE-OS 195 08 851). The connection between the piston rod and the cap is effected by means of an interference fit or press fit. Due to the fact that the piston rod is insertable into the depression in the cap it is no longer necessary to carry out the centering between the cap and piston rod as was previously required for fastening. The fastening element provided for fastening at the vehicle is welded on at the upper end of the cap.

SUMMARY OF THE INVENTION

Accordingly, it is an object of the present invention to construct the connection between the protective tube and the vibration damper so that the protective tube does not constitute a hindrance when a fastening element, e.g., an eye or a threaded pin, is fixed to the piston rod by welding, screwing, etc.

Pursuant to this object and others which will become apparent hereafter, one aspect of the present invention resides in connecting the protective tube with the piston rod in a positive engagement and/or in a frictional engagement in its region facing the fastening element.

For this purpose, the protective tube is constructed so that it can be slid over the piston rod into the area of the piston rod guide after assembling the vibration damper but before mounting the fastening eye or fastening pin. The fastening elements can be arranged at the piston rod subsequently without difficulty when the piston rod is moved out or extended, e.g., by welding, screwing or the like.

According to a further embodiment the piston rod and/or the protective tube is provided with at least one projection extending at least partially along the circumference or with at least one recess which extends at least partially along the circumference. For this purpose, the projection can advantageously snap into the recess.

After the fastening eye or fastening pin has been fitted, the piston rod can be slid into the tubular structural component part together with the fastening elements so that, after one of the projections arrives in a corresponding recess of the oppositely located structural component part, the two structural component parts are locked in a positive engagement and/or in a frictional engagement. When the piston rod moves out thereafter, the protective tube moves outward together with the piston rod.

According to another embodiment of the invention, the recess is constructed as a groove extending along the circumference. The groove advantageously has different flank angles so as to facilitate, in the relative axial movement direction of the protective tube relative to the piston rod, an easy snapping in, followed by a reliable securing or vice versa.

According to a further embodiment, the projections have a contour corresponding to the groove.

The region of the protective tube is resiliently or elastically expandable so that the protective tube can be pulled over the piston rod without difficulty.

A problem-free expansion can be achieved in that the protective tube is made of an elastic material, e.g., metal, plastic or nonferrous metal, at least in its end region.

In another embodiment, the protective tube is constructed of two parts.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 1 shows a vibration damper with a fastening eye in section;

FIG. 2 is a view similar to FIG. 1 of another vibration damper;

DETAILED DESCRIPTION OF THE PREFERRED EMBODIMENTS

Figure 3:
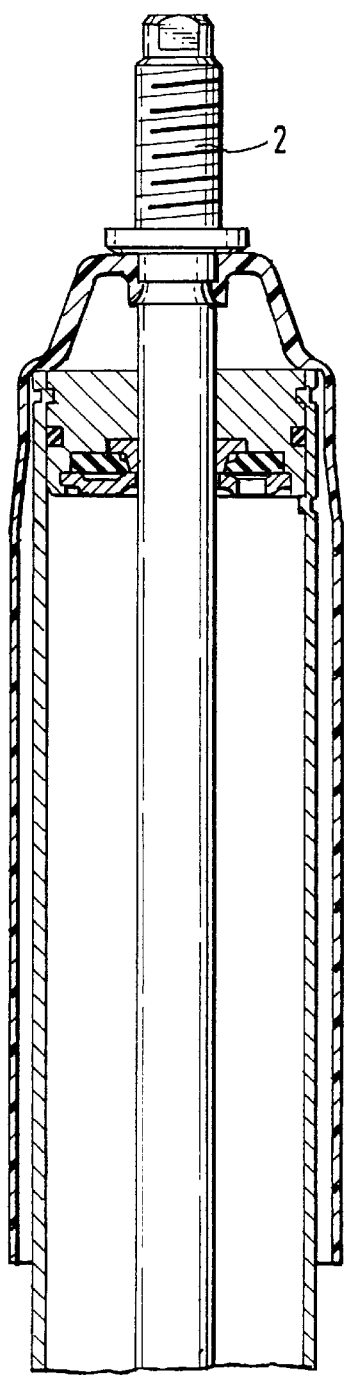
FIG. 3 is a view similar to FIG. 1 of a vibration damper with a fastening pin at the piston rod.

FIGS. 1 and 2 show a vibration damper in which the piston rod 3 is guided out of the tubular structural component part 7 via a piston rod guide 6. A fastening element 2, which is a fastening eye in this embodiment, is fixedly secured in the end region of the piston rod 3, e.g., by welding. A protective tube 1 is located outside of the tubular structural component part 7 and protects the piston rod 3 and the surface of the piston rod 3 from external influences when the piston rod 3 is moved out. The protective tube 1 has, in the region facing the fastening eye 2, a circumferentially extending projection 4 which engages in a recess 5 of the piston rod 3.

In the region of the projection 4, the protective tube 1 can expand elastically so that the piston rod 3 can be moved out farther in order to connect the fastening eye 2 with the piston rod 3, e.g., by welding, without hindering or damaging the protective tube 1.

The recess 5 in the piston rod 3 can be constructed so as to extend circumferentially, while the projection 4 of the protective tube 1 can be arranged partially along the circumference.

FIG. 3 shows an embodiment form which is similar in principle to that shown in FIGS. 1 and 2, but which differs from the latter in that a threaded pin is provided as the fastening element 2.

Figure 4:
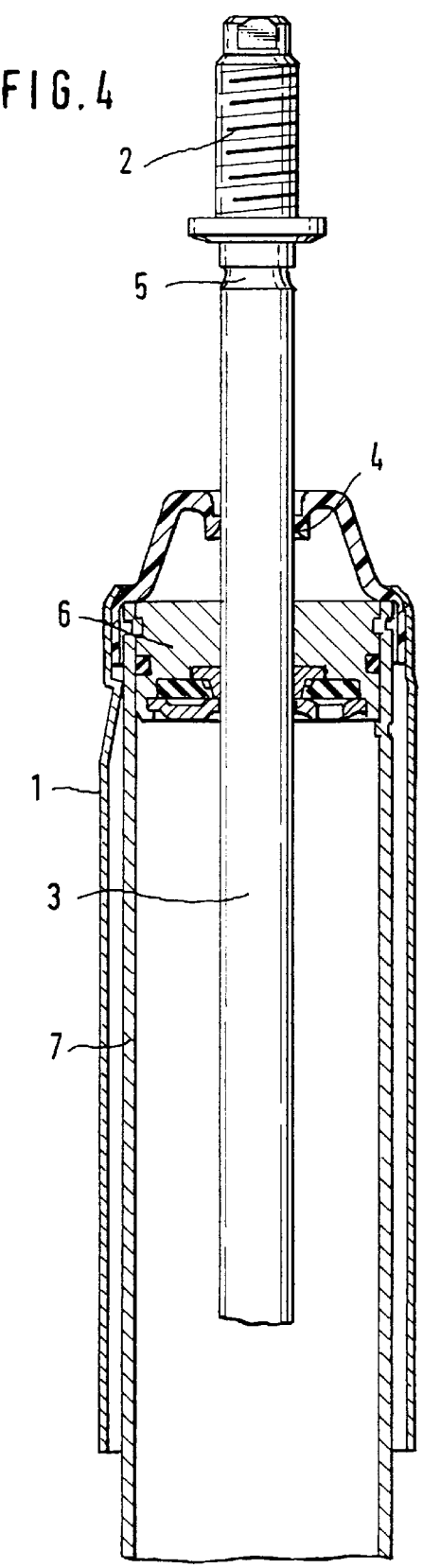
FIG. 4 is a view similar to FIG. 2 of a vibration damper with a fastening pin at the piston rod.

FIG. 4 shows the moved out piston rod 3, while the protective tube 1 remains in the region of the piston rod guide 6. This ensures that the weld between the piston rod 3 and the fastening element 2 can be achieved in a faultless manner. When the piston rod 2 is pushed inward relative to the tubular structural component part 7 in the next work step, the projection 4 of the protective tube 1 snaps into the recess 5 of the piston rod 3 and guides the protective tube 1 along with it during every inward and outward movement of the piston rod 3.

Figure 5:
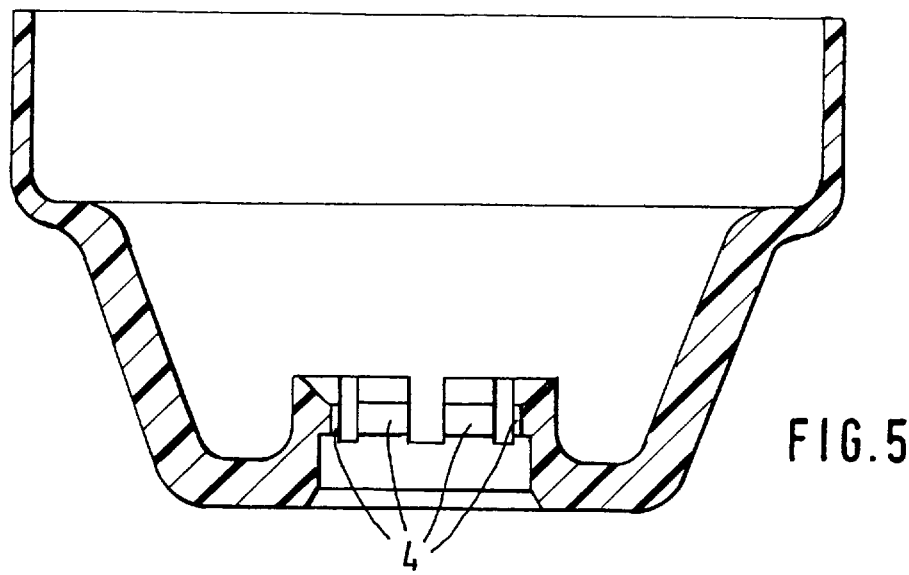
FIG. 5 shows a construction of a protective tube for use in two-part structural components.
Figure 6:
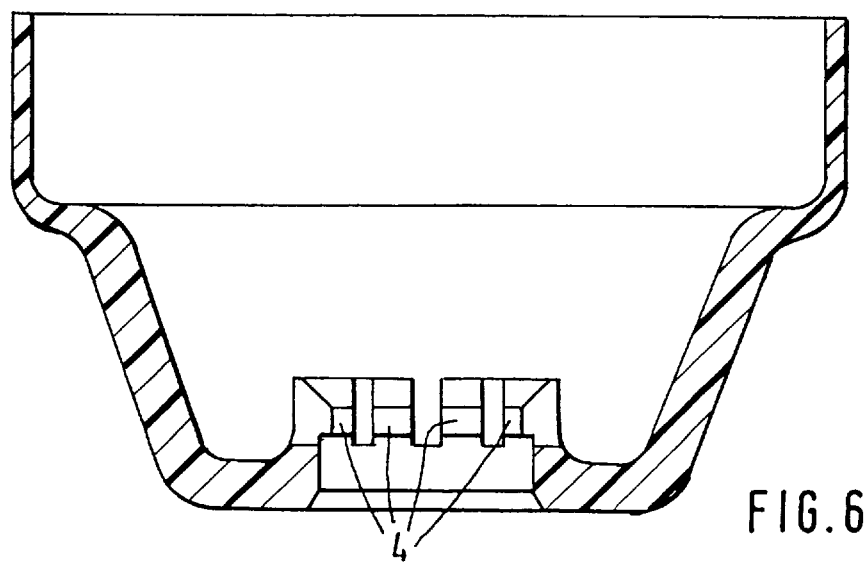
FIG. 6 shows another construction of a protective tube for use in two-part structural components.

FIGS. 2 and 4, respectively, show protective tubes 1 which are constructed in two parts. The upper region of the protective tube 1, called the protective cap, is shown in detail in FIGS. 5 and 6 and has, in its diameter facing the piston rod 3, a plurality of individual projections 4 which are arranged so as to be distributed uniformly along the circumference. This embodiment ensures a particularly favorable elastic expansion so that it is possible to slide it over the piston rod 3 without difficulty.

The invention is not limited by the embodiments described above which are presented as examples only but can be modified in various ways within the scope of protection defined by the appended patent claims.

We claim:

1. A vibration damper, comprising:
    at least one tubular structural component part;
    an axially displaceable piston rod arranged in the tubular structural component part and having an end extending from the tubular structural component part, the piston rod having a circumferential recess at the end and being of uniform outer diameter up to the recess;
    a fastening element fixed to the end of the piston rod and configured to be fastenable with a motor vehicle; and
    a protective tube arranged at the piston rod so as to enclose the tubular structural component part, the protective tube having a region facing the fastening element and being connected with the piston rod in at least one of a positive engagement and a frictional engagement in the region facing the fastening element, the protective tube having at least one projection that extends at least partially around a circumference of the protective tube so as to glide along the piston rod upon movement of the protective tube, the protective tube being slideable from the fastening element to an upper end face of the component part.

2. A vibration damper according to claim 1, wherein the recess is a groove extending along the circumference.

3. A vibration damper according to claim 2, wherein the groove is configured to have different flank angles.

4. A vibration damper according to claim 1, wherein the circumferentially extending recess has a contour, the projection being configured to have a contour that corresponds to the recess.

5. A vibration damper according to claim 1, wherein the protective tube is elastically expandable in a region of the connection between the protective tube and the piston rod.

6. A vibration damper according to claim 1, wherein the piston rod is connected to an end region of the protective tube, the protective tube being made of an elastic material at least in the end region.

7. A vibration damper according to claim 6, wherein the protective tube is made of one of metal and plastic.

8. A vibration damper according to claim 6, wherein the protective tube is made of nonferrous metal.

9. A vibration damper according to claim 1, wherein the protective tube has two parts, including an elastic protective cap connected to the piston rod.

* * * * *